Figure 1:
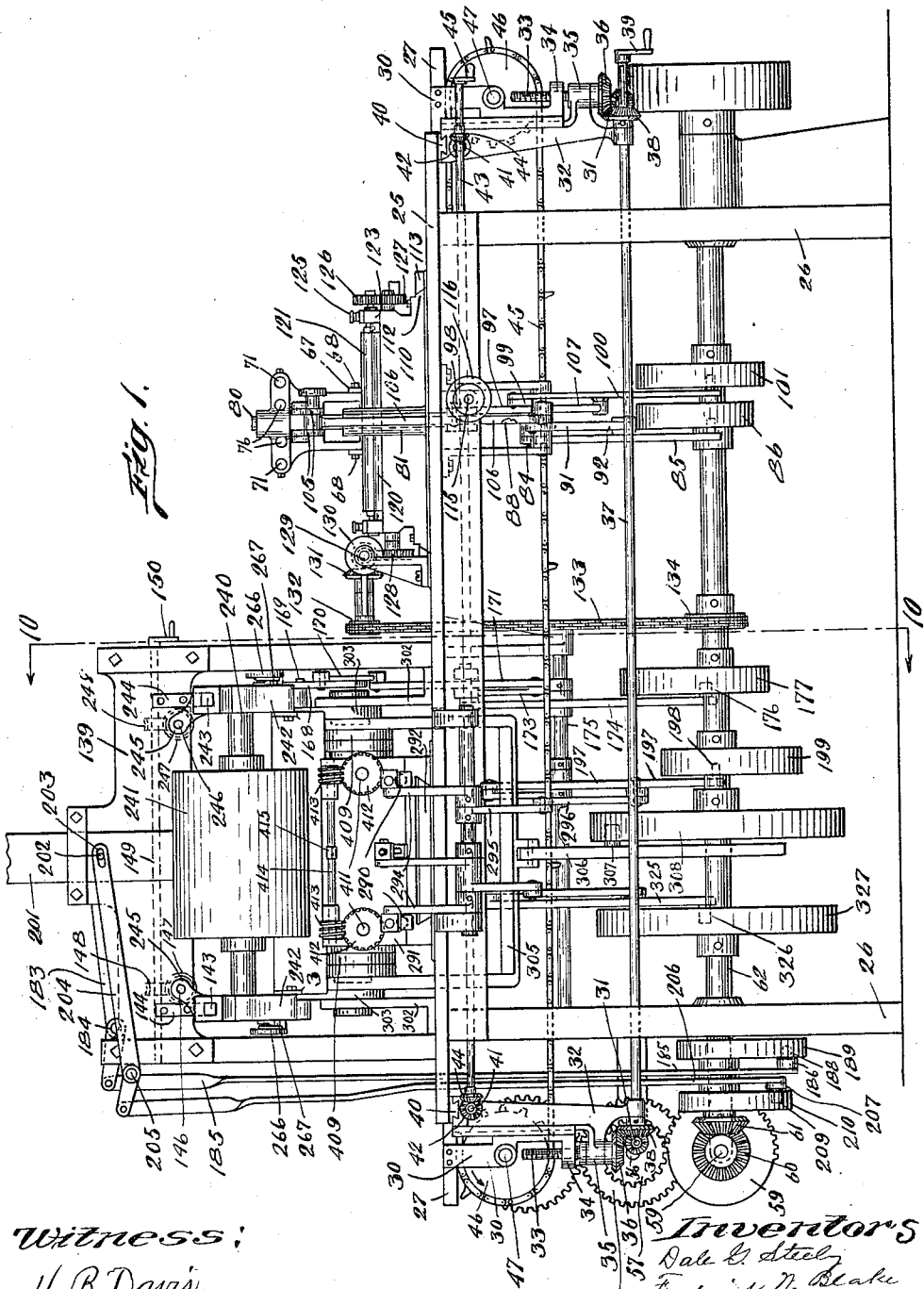

D. G. STEELY, F. W. BLAKE & G. A. LORENTZEN.
MACHINE FOR PRODUCING AND ATTACHING LACINGS TO BOXES.
APPLICATION FILED AUG. 4, 1915.

1,193,943.

Patented Aug. 8, 1916.
7 SHEETS—SHEET 1.

Witness:
H. B. Davis.

Inventors
Dale G. Steely
Frederick W. Blake
Gustave A. Lorentzen
by Hayes & Harriman
attys.

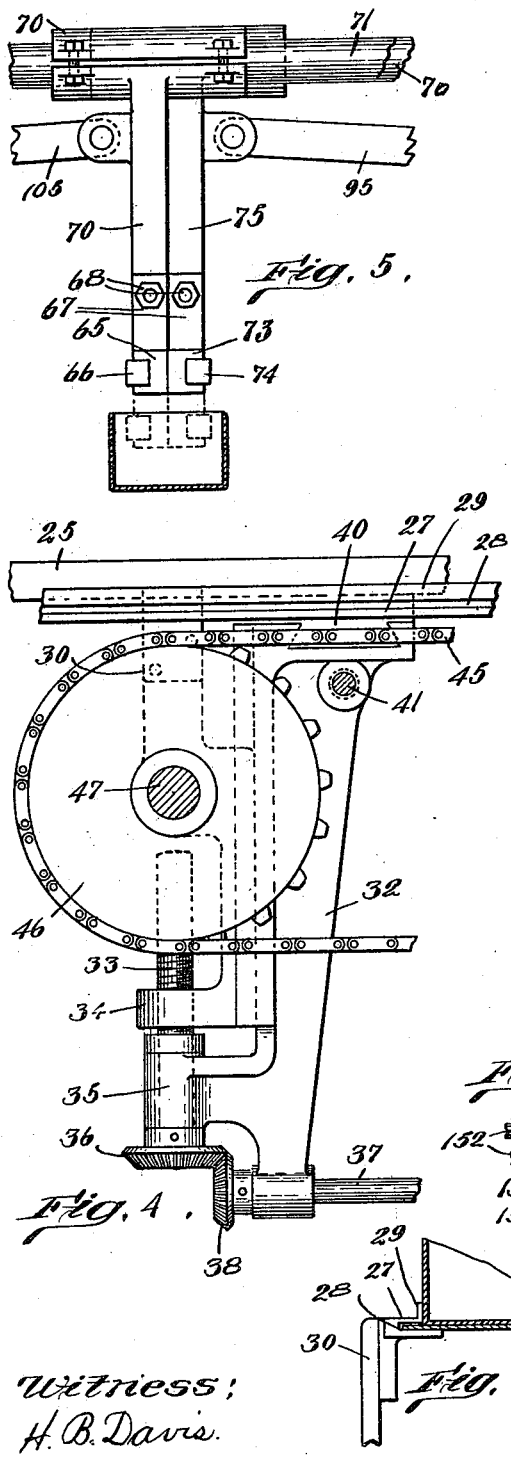

D. G. STEELY, F. W. BLAKE & G. A. LORENTZEN.
MACHINE FOR PRODUCING AND ATTACHING LACINGS TO BOXES.
APPLICATION FILED AUG. 4, 1915.

1,193,943.

Patented Aug. 8, 1916.
7 SHEETS—SHEET 4.

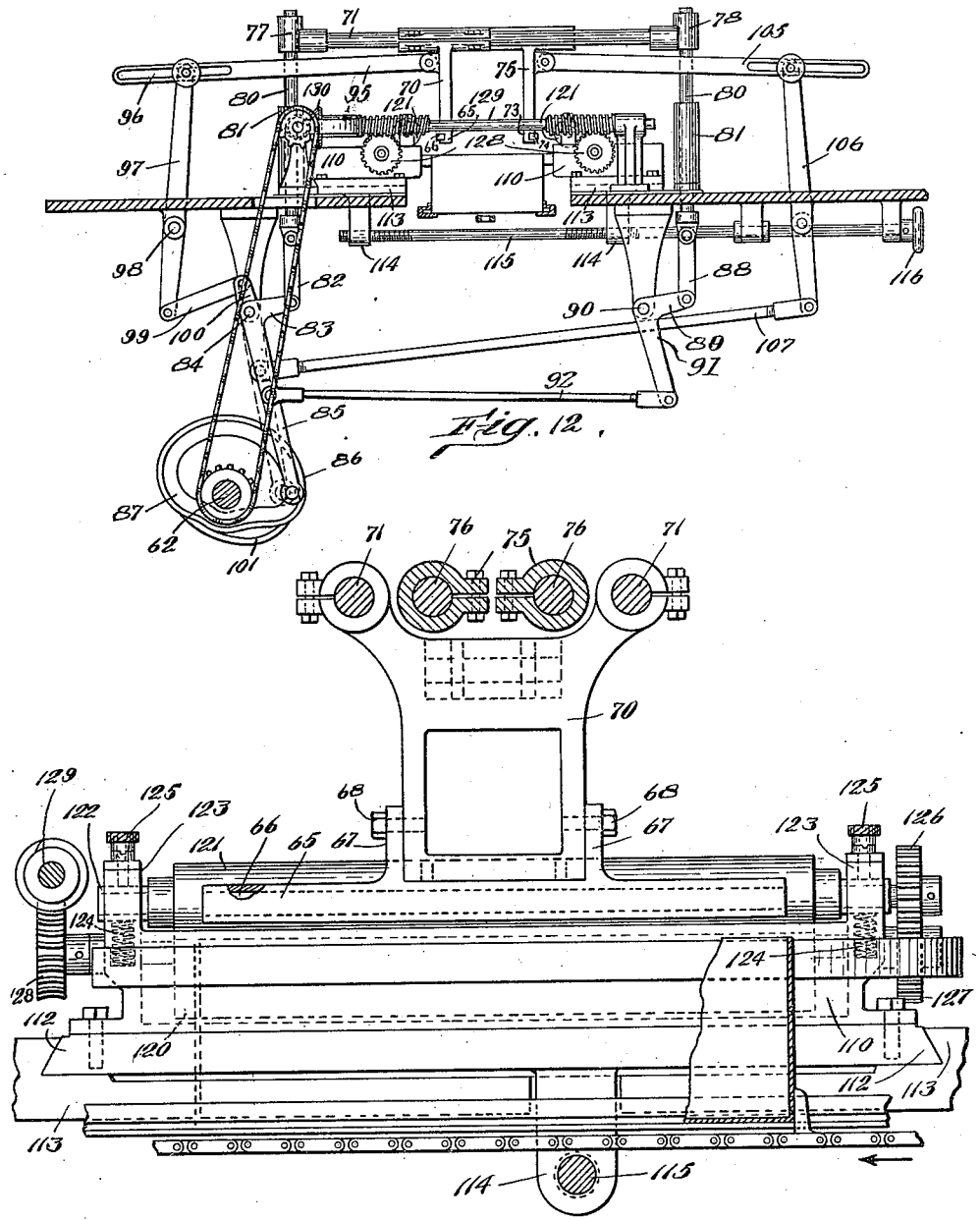

D. G. STEELY, F. W. BLAKE & G. A. LORENTZEN.
MACHINE FOR PRODUCING AND ATTACHING LACINGS TO BOXES.
APPLICATION FILED AUG. 4, 1915.
1,193,943.
Patented Aug. 8, 1916.
7 SHEETS—SHEET 6.
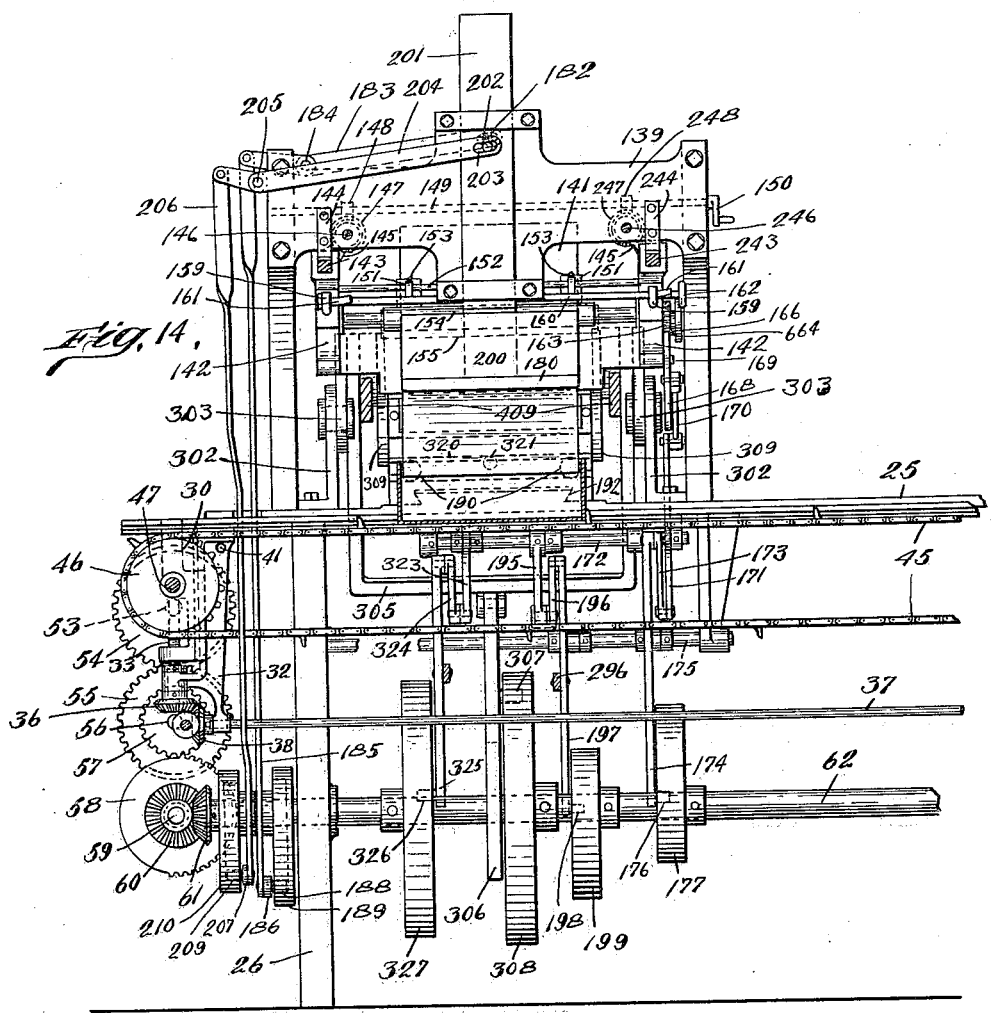

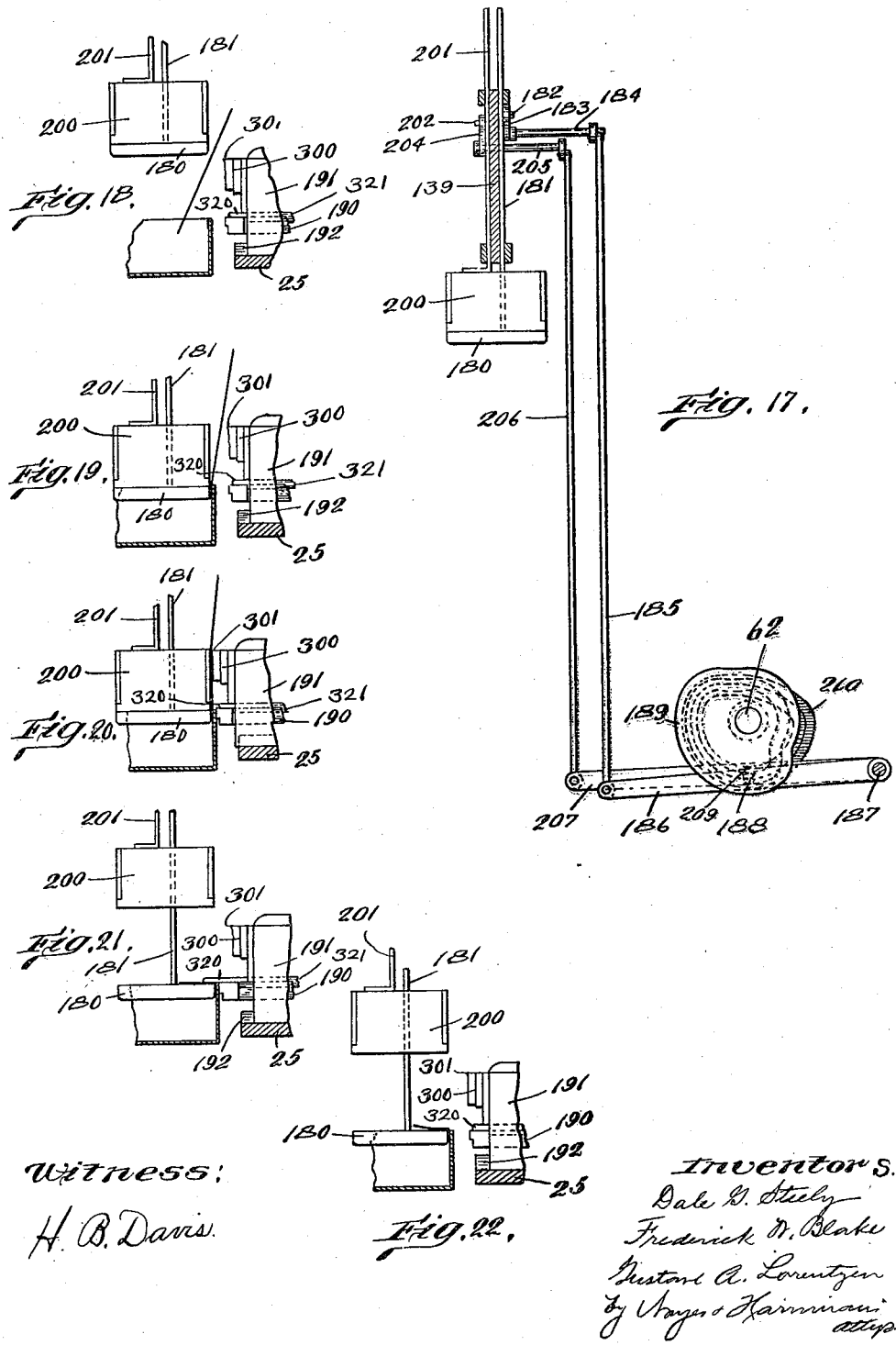

UNITED STATES PATENT OFFICE.

DALE G. STEELY, OF CAMBRIDGE, FREDERICK W. BLAKE, OF MEDFORD, AND GUSTAVE A. LORENTZEN, OF BOSTON, MASSACHUSETTS, ASSIGNORS TO W. F. SCHRAFFT & SONS CORPORATION, OF BOSTON, MASSACHUSETTS, A CORPORATION OF MASSACHUSETTS.

MACHINE FOR PRODUCING AND ATTACHING LACINGS TO BOXES.

1,193,943.      Specification of Letters Patent.      Patented Aug. 8, 1916.

Application filed August 4, 1915. Serial No. 43,676.

*To all whom it may concern:*

Be it known that we, DALE G. STEELY, residing at Cambridge, FREDERICK W. BLAKE, residing at Medford, county of Middlesex, and GUSTAVE A. LORENTZEN, residing at Boston, county of Suffolk, State of Massachusetts, respectively, citizens of the United States, have invented an Improvement in Machines for Producing and Attaching Lacings to Boxes, of which the following is a specification.

Small packing boxes commonly used at the present time for chocolates, bonbons, and other commodities, have attached to the inner-faces of their side-walls flaps composed of paper, or the like, which are perforated or otherwise made more or less ornamental in design, and are intended to be extended over the top of the contents of the box and substantially cover the same. These side-flaps are usually termed laces.

This invention has for its object the production of an organized machine, essentially automatic in action, by which the laces are produced and arranged in and attached to the boxes; although our invention is still comprehended in a machine wherein the laces are not produced by the machine.

The machine comprises essentially three groups of elements, a gluing-mechanism by which a layer of glue is deposited on the inner-face of each side-wall of the boxes; a lace-producing and attaching-mechanism by which laces are produced and attached to the glued boxes, although said element may not have lace-producing means associated therewith or forming a part thereof; and feeding-mechanism by which the boxes are conveyed successively to said mechanisms.

The feeding-mechanism may involve an endless feeding-chain upon which the boxes are placed, and by which they are fed along step by step from a receiving position into coöperative relation with the gluing-mechanism, then into an intermediate position between the gluing-mechanism and the lace-attaching mechanism where the glued boxes are permitted to repose for a short period of time, then into coöperative relation with the lace-attaching mechanism, and then into position for removal. In view of the fact that the boxes vary largely in size and dimensions, the feeding-mechanism is designed for adjustment to accommodate boxes of different heights and also of different widths, and lengths.

The gluing-mechanism may comprise a pair of gluing-members, suitably supported by a frame, in an elevated position, and adapted to be moved downward to enter the boxes and to be moved laterally to engage the inner faces of its side-walls and deposit thereon a layer of glue; and glue-supplying means for said members. Said members may be arranged for adjustment to engage boxes of different widths, and provision may be made by which gluing-members of different lengths may be employed. Said glue-supplying means may consist of a glue-receptacle for each gluing-member, having a glue-roll arranged to be engaged by said member to transfer to said member a supply of glue, and means to supply said glue-roll with glue which is contained in the receptacle. Operating-means is provided for the gluing-mechanism, by which the gluing-members are caused to operate simultaneously, or at least to simultaneously engage the inner-faces of the side-walls of the box; and also by which said mechanism is operated in correct timing relation with the intermittent movements of the feeding-mechanism, so that the gluing-mechanism will operate when the boxes are brought into coöperative relation therewith.

The lace-producing and attaching-mechanism involves means, as here shown, arranged in duplicate, for producing the laces from rolls of paper and for attaching them to the glued inner-faces of the side-walls of the box, and for perforating them, if desired. Generally speaking, this group of mechanism comprises supporting-means for two rolls of paper, means for drawing off of said rolls short lengths of paper suitable for laces and for projecting the end-portions of the strips into the open tops of the boxes; means for pressing said end-portions into engagement with the glued surfaces of the side-walls thereof, means for severing the strips at points above the tops of the boxes, thereby to form the laces and attach them to the side-walls of the boxes at their lower portions, leaving their upper-portions projecting above the boxes, and unattached.

In case it is desired that the laces shall be perforated or otherwise ornamented, suitable perforating, or ornamenting means will be employed, and said means may be associated with the severing-means, and will act to perforate or ornament the strips below the lines of severance, being the unattached portions of the laces. Also, in case it is desired that the laces shall be folded or creased so as to extend inward over the top of the contents of the box, folding or creasing-means will be employed by which the attached laces are turned inward, on a line of the fold or crease which is arranged at the edge of the box.

Figure 2:
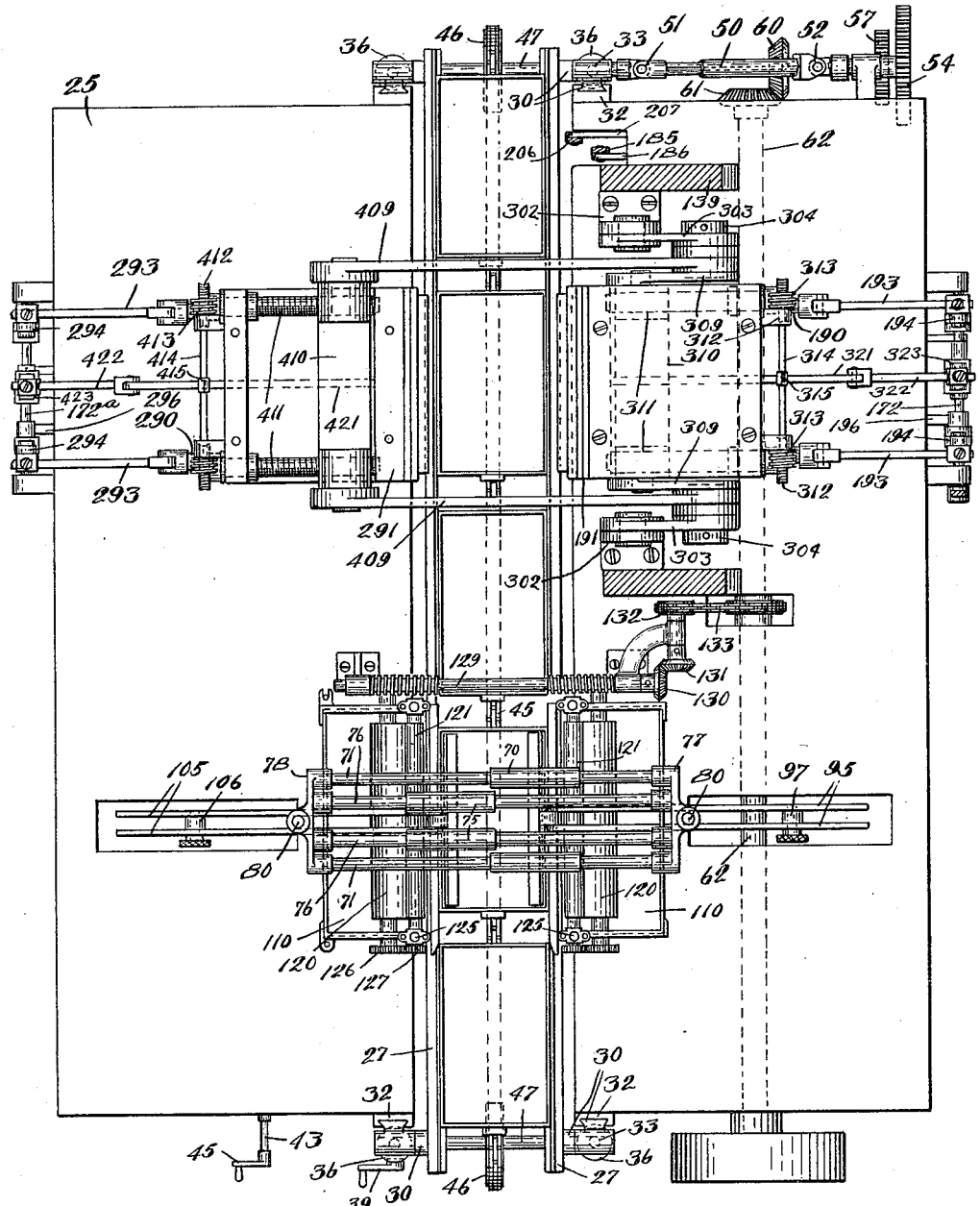
Figure 10:
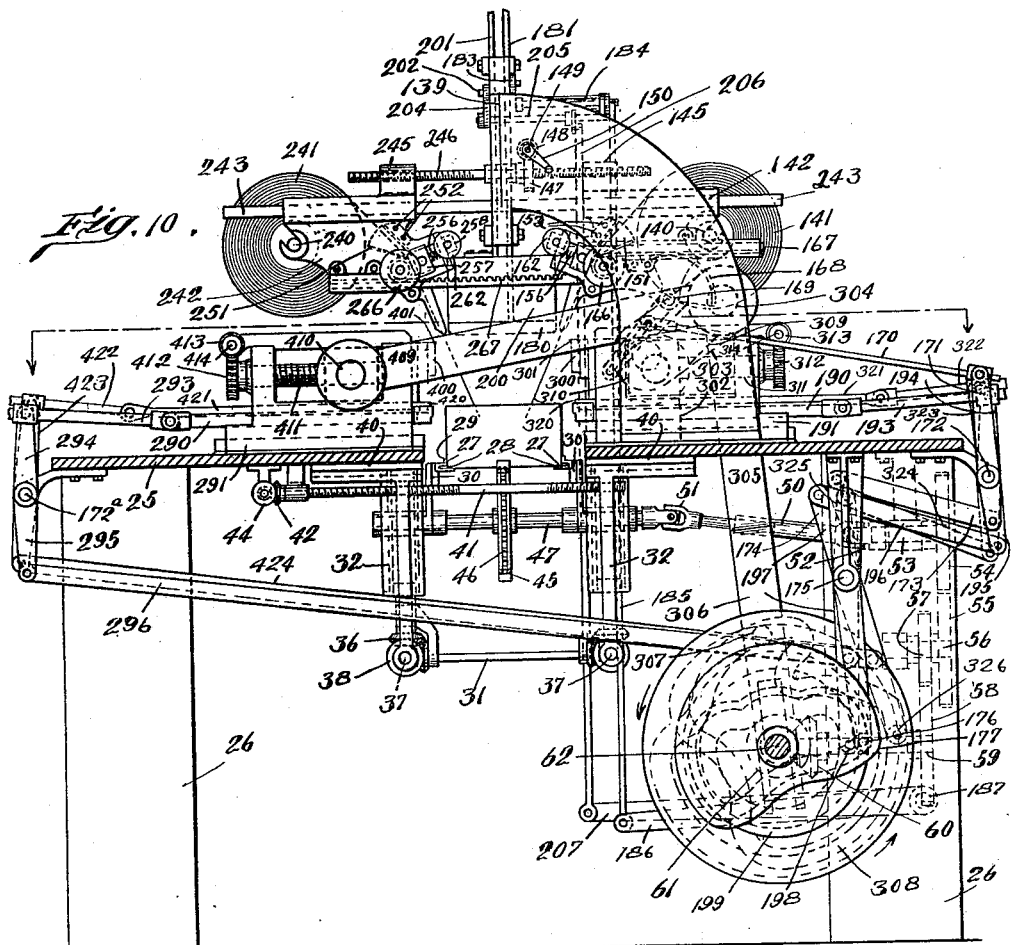
Figure 11:
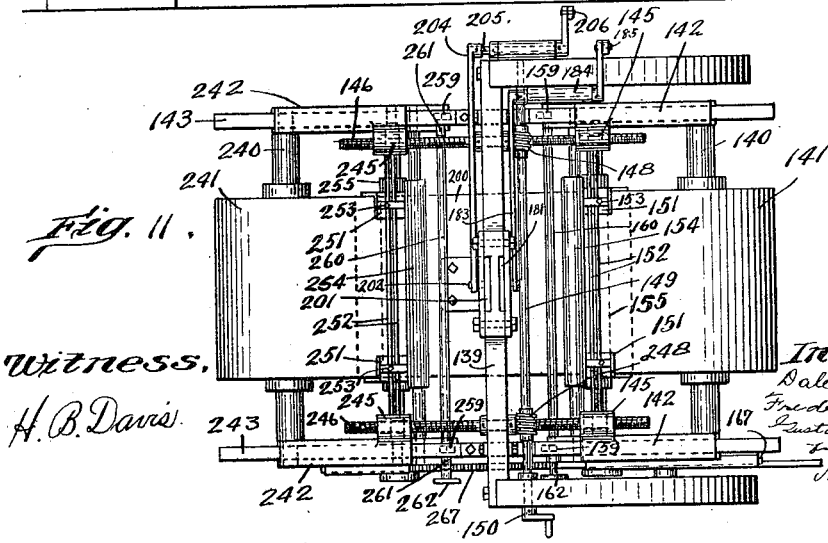

Figure 1 is a front elevation of a machine embodying this invention for attaching laces to bonbon, or other boxes. Fig. 2 is a plan view and partial section of the machine shown in Fig. 1. Fig. 3 is a sectional detail of the guiding and supporting-means for the boxes. Fig. 4 is an enlarged fragmentary detail of the feeding means. Fig. 5 is an enlarged fragmentary detail of the gluing-mechanism. Figs. 6, 7, 8, and 9 are enlarged fragmentary details of the lace-producing mechanism. Fig. 10 is a transverse vertical section of the machine, taken on the dotted line 10—10, Fig. 2. Fig. 11 is a fragmentary view in plan of the strip operating-means. Fig. 12 is a fragmentary view in elevation of the members and operating-means therefor. Fig. 13 is an enlarged sectional detail including the gluing-members. Fig. 14 is a vertical sectional detail of a portion of the machine including the lace-attaching means. Figs. 15 and 16 are detail views of the lace-producing and attaching-means. Fig. 17 is a detail view of the plunger and guide block and operating-means therefor, forming a part of the lace-producing and attaching-means. Figs. 18 to 22 are detail views of the relative positions of the parts employed for producing and attaching the laces.

The table 25, supported on legs 26, has a longitudinal opening from end to end dividing it into two parts, said opening being of a suitable width to receive the guiding and supporting-means for the boxes, and permit movement of said boxes along from end to end of the machine in a horizontal plane.

The guiding and supporting-means, here shown, consist of a pair of tracks 27, 27, arranged longitudinally in or below said opening, and in parallel relation. Each track is of angular formation in cross-section, adapting it to receive one of the lower side corners of a box, and in view of the fact that the bottoms of the boxes may or may not have an outstanding extension or flange, the tracks are made to receive either form. Referring to Fig. 3, each track comprises a flat bar with a recess 28 formed in one edge thereof, which is of considerable depth, the upper wall of the recess being turned upward at an intermediate part of its length to form an upright portion or flange 29, which is arranged at right-angles to the lower wall of the recess. Said upright portion 29, and the outer end-portion of the lower wall of the recess, arranged as shown, form a right-angular space adapted to receive a lower side corner of a box, which may or may not have an outstanding flange, and the recess 28 which opens into said right-angularly formed space serves to receive the outstanding flange on the bottom of the box, in case the box is thus provided. These tracks are arranged with their right-angular spaces facing each other, to support and guide the box. Each track is secured at each end to the upper end-portion of an end-support 30. As it is desirable to provide for adjusting the tracks 27 to different elevations, adjusting-means are here provided for the several end-supports 30. To this end, each end-support is fitted to slide vertically in a recess or guide-way formed in one side of a bracket 32, and, as two end-supports are provided for each track there will be a corresponding number of brackets. Each end-support has a screw 33, which passes through a threaded hole in a boss 34 thereon, and has a bearing in a boss 35, on the bracket 32. Each screw 33 bears at its lower end a bevel-gear 36. At each side of the machine there is a long shaft 37, extending from end to end thereof or thereabout, which shafts are supported by the bracket 32, and said shafts have a bevel-gear 38 at each end, arranged for engagement with the bevel-gears 36. Thus the two shafts are arranged, respectively, for connection with the adjusting-screws 33, at the opposite sides of the machine. Connecting shafts 31 are provided at each end of the machine having bevel-gears thereon for engaging the bevel-gears 38, thus operatively connecting together the two long shafts 37, at each end. One of the shafts 37 has a hand-crank 39, or other means by which it may be rotated. Rotation of said shaft 37, at one side of the machine, correspondingly rotates all of the bevel-gears 36, and turns all of the screws 33, to simultaneously and equally raise and lower all of the end-supports 30, and correspondingly adjust the tracks to different elevations.

It is also desirable to adjust the tracks toward and from each other to admit of guiding and supporting boxes of different widths. To this end the brackets 32 which support them are adjustably supported. As shown, each bracket 32, has a dovetail recess at its upper end which receives a dovetail projection 40, arranged on the underside of the table 25, at right-angles to the opening therein, thus supporting said bracket and permitting it to slide transversely with respect to the table, and the track which is supported on said bracket, to be correspondingly moved.

The brackets of each pair, at each end of the table, are provided, respectively, with right and left threaded holes arranged in horizontal alinement, through which right and left screw-threaded rods 41 extend, said rods having at one end a bevel-gear 42, and a long shaft 43 extends from end to end of the machine having its bearings in supports on the underside of the table, which shaft has bevel-gears 44, 44, thereon arranged for engagement, respectively, with the bevel-gear 42, 42, and said shaft has a hand-crank 45 or other means by which it may be turned. Turning of the shank 43 in one or the other direction correspondingly turns the right and left threaded rods, and correspondingly moves the brackets 32 of each pair toward and from each other, thereby to adjust them. As the lower side-corners of all of the boxes are engaged by the guiding and supporting-means the lower end-corners thereof are exposed for engagement with a suitable feeding-device by which the boxes are slid along on their guiding and supporting-means. The feeding-device, here shown, consists of a feeding-chain which comprises a sprocket-chain 45, arranged upon a pair of sprocket-wheels 46, supported, respectively, at each end of the machine and having fingers arranged at suitable intervals for engagement with the lower end-corners of the boxes, at the rear, at the middle, or elsewhere. The sprocket-wheels 46 are arranged intermediate the width of the opening in the table, and they are fixed to shafts 47, having their bearings in suitable boxes supported by the end-supports 30. These bearing-boxes are slidable with respect to the shaft to admit of the transverse adjustment of the end-supports above described. Utilizing the end-supports 30, as supporting-means for the shafts 47, said shafts are correspondingly moved therewith, so that the feeding-chain is at all times supported in correct position for engagement with the boxes.

On account of the varying positions which the shafts 47 are adapted to occupy, to compensate for adjustment of the parts, as above described, the means for driving said sprocket-wheels and feeding-chain is or may be flexibly connected with one of the sprocket-wheel shafts, and, as here shown, a telescopically arranged link 50, is connected, at one end, by a universal joint 51, with one end of one of the shafts 47, and by a universal joint 52, with a shaft 53. The shaft 53 bears a spur-gear 54, which engages the spur-gear 55 secured to a shaft 56, bearing a pinion 57, which engages a mutilated spur-gear 58, secured to a shaft 59, bearing a bevel-gear 60, which engages a bevel-gear 61, secured to the main driving-shaft 62. The main driving-shaft 62 is designed to be rotated continuously, but by means of the mutilated spur-gear 59, which forms a component part of the train of gearing, the shaft 47 and sprocket-wheel borne by it, are rotated intermittingly, thus operating to move the feeding-chain intermittingly, for short distances. This intermittingly moving feeding-chain acts to move the boxes along their guiding and supporting-means step by step, from one to another group of mechanism, which form a part of the organized machine here shown. Said feeding-chain is made quite long, and, as shown in Fig. 2, is arranged to support five boxes, in a row. The first box-position is utilized to receive the boxes which are placed thereon by hand; the second box-position is utilized to hold the boxes in coöperative relation with gluing-mechanism, to be hereinafter described; the third box-position is utilized to hold the boxes after they have been glued and before the laces are attached, the boxes dwelling in this position for a short period of time to enable the freshly applied glue to become tacky; the fourth box-position is utilized to hold the boxes in coöperative relation with lace-attaching mechanism, to be hereinafter described; and the fifth box-position is utilized to hold the boxes in position for removal from the chain. This arrangement, however, and also the provision for a definite number of box-positions may be changed without departing from our invention. Each movement of the feeding-chain is sufficient to move the boxes from one to another position, so that they are successively and automatically moved throughout the machine.

The gluing-mechanism is designed to apply a layer of glue, paste, or other adhesive substance to the inner-faces of the opposite side-walls of the boxes; and one form of gluing-mechanism is here shown to illustrate one embodiment of our invention. Said mechanism comprises two gluing-members, one for each side-wall of the box, which is adapted to deposit a layer of glue thereon; and two glue-receptacles, one for each gluing-member, each receptacle having a glue-roll; and operating-means for the gluing-members arranged to move them laterally or otherwise into engagement with the glue-rolls and also into engagement with the inner-faces of the side-walls of the boxes. One of the gluing-members consists of a bar 65, made substantially as long as the box or thereabout, having a felt-pad 66, or equivalent, arranged upon it and adapted to serve as an engaging-face, said pad being co-extensive with the area of the layer of glue which it is desired to deposit on the wall of the box. The bar 65 has a pair of ears 67, which, by means of screws or bolts 68, detachably connect it to a frame 70; and said frame is slidably arranged on a pair of horizontally disposed cross-bars 71, or other supporting-means, which are arranged above it.

Detachable connection of the gluing-member to the frame admits of the employment of gluing-members of different lengths to accommodate boxes of different lengths. Slidably arranging the frame 70, bearing the gluing-member on the supporting-bars, admits of a movement of the gluing-members longitudinally of the bars, whereby said member may be moved laterally to engage the glue-roll and thereafter to engage the inner-face of the side-wall of the box; and such sliding movement also admits of adjustment of the gluing-member for boxes of different widths. Two bars are employed merely to form a substantial support for the member. The other gluing-member is similarly constructed, it consisting of a bar 73, with pad 74 thereon, said bar being detachably secured to a frame 75, slidably arranged on a pair of horizontal cross-bars 76.

The several cross-bars 71 and 76 are connected at one end to an end-piece 77, and at their other end to an end-piece 78, so that a rigid structure is provided, which structure supports the gluing-members. Obviously said rigid structure may be otherwise constructed to support the gluing-members and admit of sliding movements thereof. The rigid frame extends over and across the opening in the table, thus to support the gluing-members in an elevated position above a box, which may be reposing on the feeding-chain. Said rigid structure or frame is designed to be moved vertically to correspondingly move the gluing-members from a position for engagement with the glue-rolls to a position for engagement with the inner-faces of the side-walls of the box, and to thus move vertically said frame upright posts 80 are connected at their upper ends to the end-pieces of the rigid-frame structure which extend downward through tubular bearings 81, supported in upright position on the table, at each side of the opening therein. Said upright posts 80 extend down through holes in the table for connection with their operating-means. A link 82 is connected to the lower end of one of the posts, which is also connected with one arm 83 of a bell-crank lever, pivoted at 84 to an ear on the underside of the table, the other arm 85 of said bell-crank lever extending downward for engagement with a cam-disk 86, which is secured to the main-shaft 62, said arm having a pin, with or without a roll thereon, which is adapted to enter a groove 87 in one side of said cam-disk. A link 88 is connected to the lower end of the other post 80, which is connected with one arm 89 of a bell-crank lever, pivoted at 90 to an ear on the other side of the table, the other arm 91 of said bell-crank lever having connected with it a long link 92, which is connected with the arm 85 of the aforesaid bell-crank lever. Thus it will be seen that both posts are connected with and adapted to be operated by the cam-disk 86. Vertical movement of the frame bearing the gluing-members is in a straight line, but, as here shown said gluing-members have a lateral movement at a part of their vertical movement, as, for instance, at the upper end thereof, by which they are caused to engage the glue-rolls, and have another lateral movement at another part of said vertical movement, as for instance at the lower end thereof, by which they are caused to engage the inner-faces of the side-walls of the boxes. The groove in the cam-disk 86 is shaped so as to cause vertical movement of the gluing-members, and to permit said members to dwell at each end of their stroke, or other parts thereof, to admit of lateral movements.

There is loosely connected to one gluing-member a link 95, having a slotted end-portion 96, and the upper end of a lever 97 is secured to the slotted end-portion of the link, which lever is pivoted at 98; and the lower end of said lever is connected by a link 99 with a lever 100, which is pivotally supported on the pivot-shaft 84, the lower end of said lever extending downward for engagement with a cam-disk 101, secured to the main-shaft 62, said lower end of the lever having a pin, with or without a roll thereon, adapted to enter a groove in the side of the cam-disk 101. Similar link and lever connections are provided for the other gluing-member, as for instance, there is a link 105 loosely connected with said member having a slotted end-portion to which the upper end of a pivoted lever 106 is connected, the lower end of said lever being connected by a link 107 with the aforesaid lever 100, which engages the cam-disk 101. The groove in said cam-disk 101 is shaped so as to cause lateral movements of the gluing-members, to and fro, at each end of the up-and-down strike of said members so that at the upper end of the stroke said gluing-members will be moved laterally for engagement with the glue-rolls, and at the lower end of the stroke will be moved laterally for engagement with the inner-faces of the side-walls of the boxes. The end-portions of the links 95 and 105 are slotted to provide for their connection with the levers 97 and 106, regardless of the positions of the gluing-members, thus admitting of adjustment of said members laterally to accommodate boxes of different widths. The two gluing-members are designed for simultaneous operation and they enter the box and move in opposite ways for engagement with the inner-faces of the side-walls thereof, and such engagement being simultaneous or substantially so, the box need not necessarily be supported by means other than by the feeding-chain which carries it and upon which it reposes.

Glue-supplying means are provided for both gluing-members, which are arranged adjacent thereto, and as here shown each means comprises a glue-containing receptacle 110, slidably supported on the table, the supports therefor being arranged at opposite sides of the opening in the table, and the sliding movements thereof being at right-angles to the opening. Sliding movement of the receptacle is provided for purposes of adjustment to accommodate the gluing-members when adjusted to different positions to accommodate boxes of different widths. The receptacles have dovetail bottoms 112, arranged to slide in ways provided on supports 113, arranged on the table. Each receptacle has an ear 114, which extends downward through a hole in the table, and a right and left screw-rod 115 is arranged in threaded holes in said ears, adapted to be turned to adjust the receptacles by sliding them. Said screw-rod has a hand-wheel 116 by which it may be turned. Each receptacle has arranged therein a supplying-roll 120, which is provided with journals having their bearings in the side-walls of the receptacle, and also another roll, herein termed the glue-roll 121, which is provided with journals having their bearings in blocks 122, which are arranged in a housing 123, and held in engagement with springs 124 by an adjusting-screw 125. The glue-roll 121, thus yieldingly engages the supply-roll 120, and receives glue from this member which is submerged in the glue contained in the receptacle.

Both glue-rolls are adapted to be positively driven, but in opposite directions, and, as here shown, the glue-roll 121 has a spur-gear 126 secured to one of its journals, which gear is in mesh with a spur-gear 127, secured to one of the journals of the supply-roll 120, and the other journal of said supply-roll has a worm-wheel 128. A right and left worm-shaft 129, is supported in suitable bearings on the table, which extends across the opening therein and is arranged to engage both worm-wheels, and said shaft has secured to it a bevel-gear 130, which engages a bevel-gear 131, secured to a short shaft bearing a sprocket-wheel 132, over which passes a sprocket-chain 133, which also passes over a sprocket-wheel 134, secured to the main driving-shaft 62. This driving-means for the rolls admits of lateral adjustment of the glue-receptacles and rolls borne by them. In lieu of this form of driving-means for the glue-roll, other suitable means may be employed, the object being to drive the glue-rolls positively and in opposite directions, so as to deposit a good supply of glue on the pads of the gluing-members. As here shown, the glue-rolls being located above the table, the engaging-faces of the gluing-members are or may be arranged to occupy, normally, positions in the same horizontal plane but a short distance in front of said rolls, so that upon lateral movements of the gluing-members said rolls will be engaged, but, obviously, the glue-rolls may be otherwise arranged with respect to the gluing-members.

The lace-attaching mechanism and lace-producing means are here shown as associated together and form an organized group of elements, and two such groups of elements are provided, which are arranged one at each side of the opening in the table, so as to provide laces for the opposite side-walls of the boxes. Generally speaking, the paper of which the laces are composed is in strip form and is taken from rolls from which predetermined lengths are drawn. The end-portions of the strips are attached to the side-walls of a box and then the strips are severed a short distance above the top of the box, and perforated or otherwise ornamented, and the severed portions, which are left attached to the side-walls of the box and extend a short distance above it, form the laces. The unattached portions of the laces are thereafter folded inward to extend over the top of the contents of the box.

140 and 240 represent the reels on which the rolls of paper 141 and 241 are mounted. These reels are loosely mounted in recesses formed in brackets, there being a pair of brackets as 142, 242, for each reel. A pair of heavy supporting-bars 143, 243, here shown as quadrangular in cross-section, are supported at points intermediate their length, by hangers 144, 244, securely attached to an upright frame-structure 139, erected on the table, at one side of the opening, the upper end-portion of the table to approximately the middle thereof. Said bars 143, 243, being thus supported in elevated position above the table, are arranged in horizontal planes and transversely with respect to the opening in the table and extend in opposite ways from their hangers. The pair of brackets 142 are suported on said bars in rear of the hangers, and the pair of brackets 242 are supported on said bars in front of the hangers, and they are arranged to face each other, and for purposes of adjustment toward and from each other, they are slidably supported on said bars. Each bracket has an ear rising from it, 145, representing the ears on the brackets 142, and 245 representing the ears on the brackets 242. The ears on one bracket of each pair have right and left threaded holes through them, respectively, which receive a right and left screw-threaded rod 146, which has secured to it a worm-wheel 147, which is engaged by a worm 148 secured to a shaft 149, having a handle 150 by which it may be turned.

The ears on the other bracket of each pair have right and left threaded holes through them, respectively, which receive a right and left screw-threaded rod 246, which has secured to it a worm-wheel 247, which is engaged by a worm 248, secured to said shaft 149. By turning said shaft 149, by means of the handle 150, both screw-rods 146 and 246 are turned, thereby to simultaneously adjust all of the brackets toward and from each other according to the direction of rotation of the handle.

The strips of paper are drawn from the adjacent sides of the rolls, in downwardly inclined directions, toward a box which is reposing on the feeding-chain or other supporting-member in the opening of the table, so that the ends of the strips will enter or project into the top opening of the other box for a greater or lesser distance, as desired, which may be according to the area or width of the layers of glue which are deposited on the side-walls of the box for engagement with said layers of glue.

On each pair of brackets a pair of guiding-members are arranged for the edges of the strip which are supported in a manner to admit of adjustment toward and from each other to accommodate strips of different widths, and said guiding-members are similarly constructed, but arranged facing each other.

151 represents the guiding-members for one pair of brackets, and 251 represents the guiding-members for the other pair of brackets, and said members are made of angularly formed plates to provide for engaging their supports, and for guiding the strips. The guiding-members on one bracket are slidably arranged on a pair of horizontally disposed bars 152, which are supported by the brackets and are held in fixed position relative thereto by said screws 153, and the guiding-members on the other pair of brackets are slidably arranged on a similar pair of horizontally disposed bars 252, which are supported by the brackets and are held in fixed position relative thereto by said screws 253.

Each pair of brackets support a pair of feeding-rolls which engage the strip which is associated therewith, and feed forward a predetermined length, equal to the amount required for a lace.

154, 155, represent the feeding-rolls which are associated with one of the brackets, the roll 154 being held in yielding engagement with the roll 155 by springs 156, which exert their pressures upon blocks 157, which serve as bearings for the roll 154. Also said roll 154 is movable bodily with respect to the roll 155 to admit of a free passage of the strip between the rolls, and for the accomplishment of this result pins 158 are attached to the blocks 157, which extend through the supports, and have eyes 159, above the supports, and a horizontally disposed rod 160, extended through the eyes of both pins, said rod having thereon two cams 161 for engagement with the walls of the eyes upon a longitudinal movement or thrust of said rod. Said rod has a hand-piece 162, arranged at one end, by which it may be moved longitudinally thereby to lift said roll 154. The roll 155 is adapted to serve as the driving-roll of the pair of rolls, it having a spur-gear 163, arranged loosely on one of its journals, and a pawl-carrier 164 attached to it, which carries a pawl 165, engaging an internal ratchet-wheel 166, secured to said journal. The spur-gear 163, being loosely supported, admits of its oscillation, and the rack-bar 167 engages said spur-gear which is arranged for longitudinal reciprocation, thereby to intermittently rotate the roll 155 upon its reciprocating movements.

254, 255, represent the feeding-rolls which are associated with the other pair of brackets, the roll 254 being held in yielding engagement with the roll 255, by springs 256, which exert their pressures upon the blocks 257, which support said rolls 254. Also said roll 254 is movable bodily with respect to the roll 255, to admit of the free passage of the strip between the rolls, and for the accomplishment of this result pins 258 are attached to the blocks 257, which extend through the supports and have eyes 259, above the supports and a horizontally disposed rod 260 extends through the eyes of both pins, said rod having thereon two cams 261 for engagement with the walls of the eyes upon a longitudinal movement or thrust of said rod. Said rod has a hand-piece 262, arranged at one end, by which it may be moved longitudinally thereby to lift said roll 254. The roll 255 is adapted to serve as the driving-roll of the pair of rolls, it having a spur-gear 263, arranged loosely on one of its journals, and a pawl-carrier like 164 attached to it, which carries a pawl, like 165, engaging an internal ratchet wheel 266, which is secured to said journal. The spur-gear 263, being loosely supported, admits of its oscillation, and a rack-bar 267 engages said spur-gear which is arranged for longitudinal reciprocation, thereby to intermittingly rotate the roll 265 upon its reciprocating movements.

In order that one operating-means may be employed for reciprocating both rack-bars, said rack-bars are connected together and movable as one, and a toothed-sector 168, engages one of the rack-bars as 167, for instance, which sector is pivoted at 169, and has a slotted arm extended from it, to any part of the slot of which one end of a link 170 is attached, the other end of said link being loosely connected to the upper end of a lever 171, pivoted at 172, and the lower end of said lever having one end of a link 173 loosely connected with it, the other end of which link is loosely connected to the upper end of a lever 174, pivoted at 175, and the lower end of said lever having a pin 176, with or without a roll thereon, which engages a groove in the side of a cam-disk 177, which is secured to the main-shaft 62. As said main-shaft rotates through link and lever-mechanism described, said rack-bars are reciprocated longitudinally, thereby to intermittingly rotate the feed-rolls. The slot in the arm of the sector 168, admits of adjustment of the link 170, to different parts thereof, to provide for moving the rack-bars greater or lesser distances for the purpose of varying the length of the paper which is fed forward by the feeding-rolls. The two connected rack-bars are or may be supported upon the brackets. The lower end-portions of the brackets are formed as chutes or guides for the free end-portions of the strips, to assist in guiding them downward and for holding them against lateral movement.

The free end-portions of the strips having been projected downward into the glued box, at opposite sides thereof, means, such for instance, as a plunger 180, is moved downwardly between said end-portions of the strips into the box, which plunger is made of substantially the same area as the opening in the box, so as to engage and move the end portions of the strips laterally into engagement with the glued surfaces of the side-walls of the box, and said plunger has its lower corners rounded off to facilitate its entrance into the box. The plunger is secured to the lower end of a plunger-rod 181, arranged vertically and adapted to slide in bearings provided for it in the upright frame; and it may be removed easily from its bearings to enable other plungers of different dimensions to be supplied for boxes of different dimensions. The plunger-rod has a pin 182, which enters a slot in one end of a lever 183, pivoted at 184, the other end of said lever being connected by a link 185, with one end of a lever 186, pivoted at 187, said lever 186, having a pin 188, with or without a roll thereon, for engagement with a groove in the side of a cam-disk 189, which is secured to the main-shaft 62. Rotation of said shaft operates through the cam-disk and link and lever-mechanism to reciprocate the plunger and cause it to dwell for a predetermined period of time at the upper end of the stroke. Dwelling of the plunger at the lower end of its stroke for a period of time is utilized to enable other parts to be hereinafter described to operate in coöperation therewith.

The plunger is preferably made of a thickness substantially coextensive with the width or area of the layer of glue which is deposited on the side-walls of the box, and acts to hold the end-portions of the strips in engagement with said layers by pressure, to cause said end-portions to firmly engage the glued side-walls, and as the side-walls of the box are not supported against lateral deflection, inwardly moving-means are arranged outside of the box at opposite sides thereof, at the top, which when operated and moved inwardly will engage the upper edge-portions of the side-walls of the box and hold them against outward deflection, and thereby press the glued side-walls and end-portions of the strips firmly together. Said inwardly moving means, as here shown, comprises a pair of horizontally arranged sliding presser-bars 190, 290, each bar having an engaging-portion arranged to engage the side-wall of a box, said pairs of bars being mounted, respectively, and arranged for longitudinal movement in blocks 191, 291, which are arranged at the opposite sides of the opening in the table, at points opposite the position where the box reposes when receiving the plunger. These blocks 191, 291, are or may be adapted to slide longitudinally on the table and are here so shown, they having dovetail recesses in their bottoms adapted to receive dovetail projections 192, 292, secured to the top of the table. In so far, however, as longitudinal movements of the presser-bars 190, 290, are concerned, said blocks 191, 291, may be stationarily supported. The engaging portions of the presser-bars are made as long as the boxes, to engage their side-walls throughout their length, and said engaging-portions may be detachably connected with the bars in order that engaging-portions of different lengths or dimensions may be provided for engaging boxes having side-walls of greater or lesser length. Said presser-bars are loosely connected, respectively, with links 193, 293, with the upper ends of the arms 194, 294, the lower ends of which are secured, respectively, to rock-shafts 172, 172$^a$. Arms 195, 295, extend downward from said shafts, one of which arms, as 195, is connected by a link 196, with the upper end of a lever 197, pivoted at 175, the lower end of said lever having a pin 198, with or without a roll thereon, for engagement with a groove on one side of a cam-disk 199, which is secured to the main-shaft 62; and the other arm, as 295, is loosely connected to one end of a long link 296, which is connected with the aforesaid lever 197. As the main-shaft rotates the several presser-bars are moved inward at the same time and engage the outer side of the side-walls of the box.

The end-portions of the strips being thus attached to the side-walls of the box, are now severed, although it will be understood that the severing of the strips and the attaching of them to the side-walls may be accomplished at approximately the same time. The means for severing the strips to form the laces is also constructed in duplicate in order that both strips may be severed simultaneously, and comprise cutting-plates 300, 400, detachably connected to the adjacent end-walls of the blocks 191, 291, which have strip-severing edges 301, 401, arranged to engage the strips for the purpose of severing them, and said cutting-plates are arranged for coöperation with a die-block 200, which is adapted to be moved into a position between the strips, at a point immediately above the plunger. The cutting-plates are movable inward toward each other, and sever the strips by pressing the strips against the die-block or entering grooves in said blocks, or it will be understood that the die-blocks may be arranged for coöperation with said cutting-plates in any other suitable manner. The cutting-plates may be shaped to form an ornamental edge on the lace when severed from the strip, or a straight edge, as desired.

In case it is desired to perforate the laces to produce an ornamental design, which at the present time is in vogue, the cutting-plates will be substantially co-extensive with those portions of the end-portions of the strips between the attaching-portions and the lines of severance, and over these areas suitably formed cutting-projections will be arranged on the plates, and the die-block will be formed with its opposite sides at least coextensive with said cutting-plates and will have coöperating surfaces for engagement therewith of the projections. By this arrangement the laces are perforated at or about the same time they are severed from the strips. Movements of the cutting-plates are accomplished by the sliding movements of the blocks 191, 291, heretofore referred to, but the operating-means by which they are moved longitudinally will now be described.

302 represents a pair of fixed standards arranged on the table, at one side of the opening therein, and a pair of links 303 are pivotally connected at one end to said standards, the other ends of said links being loosely connected by the pivot-pin 304, to the upper ends of the arms 305 of a yoke, said arms extending downward through holes in the table; and there is formed integral with, or connected with the crown of the yoke, an arm 306, having a pin 307, with or without a roll thereon, for engagement with a groove in a cam-disk 308, which is secured to the main-shaft 62. The lower end-portion of said arm 306, is bifurcated and extends down over the main-shaft 62, to serve as a guide for said arm and its yoke. A pair of short links 309, are loosely connected at one end to the pivot-pin 304, and the other ends of said links are loosely connected to the opposite ends of a nut 310, mounted on one or more screws 311, having their bearings in the end-walls of the block 191, two such screws being here shown, and said nut is adjustable along on the screws by turning the screws. This adjusts the sliding movement of the block to accommodate boxes of different dimensions. As a means for turning said screws they may have worm-wheels 312, secured to them, which are engaged by worms 313, secured to a shaft 314, said shaft having a squared portion 315, for engagement therewith of a suitable tool by which it may be turned. A pair of long links 409, are loosely connected at one end to the pivot-pin 304, the other ends of said links being loosely connected to the opposite ends of a nut 410, mounted on one or more screws 411, having their bearings in the end-walls of the block 291, two such screws being here shown, and said nut is adjustable on the screws by turning the screws. This adjusts the sliding movement of the block 291 in a manner similar to the adjustment of the block 191. As a means for turning said screws they may have worm-wheels 412, secured to them which are engaged by worms 413, secured to a shaft 414, said shaft having a squared portion 415, for engagement therewith of a suitable tool by which it may be turned. As the main-shaft 62 rotates, the cam-disk 308 is rotated and the links aforesaid moved on their pivots in the fixed standard 302, and the boxes 191, 291, will be reciprocated longitudinally toward and from the die-block, thereby to sever the strips, and, if desired, to perforate the severed portions.

The die-block 200 is movable into and out of operative position, and, as here shown, is attached to the lower end of a rod or bar 201, arranged vertically and slidable in recesses in the frame structure. Said bar has a pin 202, which engages a slot 203, in one end of a lever 204, pivoted at 205; the other end of said lever being loosely connected to the upper end of a long link 206, the lower end of which link is loosely connected to one end of a lever 207, pivoted at 187, said lever having a pin 209, with or without a roll thereon, for engagement with a groove in the side of a cam-disk 210, secured to the main-shaft 62. As said main-shaft rotates through the link and lever-mechanism described the die-block will be reciprocated vertically. The die-block 200, is of substantially the same horizontal cross-sectional area as the plunger, and normally is supported in engagement with the top of the plunger or is closely associated therewith, as represented in Fig. 18. These elements are movable downward together, as represented in Fig. 19, and while reposing in this position the blocks 191, 291, and the presser-bars are moved inward, as represented in Fig. 20; then the die-block is restored or at least caused to recede independently of the plunger and may be restored to its normal position to permit of the operation of a folding or creasing-device, as represented in Fig. 21. After the folding-device has operated the plunger is then permitted to return to its normal position, and during such return movement passes the folded unattached portions of the laces, but the laces will return at least partially.

A folding-device for the laces is or may be employed, and when employed care is taken that the top of the plunger is made smooth to form a bed over upon which the laces are folded. The downward movement of the plunger is sufficient to bring its top surface substantially flush with the top of the box, so as to present a bed for folding the laces at the proper place. The folding-device comprises a pair of blades 320, 420, horizontally arranged on the blocks 191, 291, in a plane above the presser-bars, and said blades are secured to horizontally arranged rods 321, 421, slidable in suitable bearings in said blocks, and the outer ends of one of said rods, as 321, is loosely connected by a link 322, to the upper end of a lever 323, pivoted at 172, the lower end of said lever being connected by a link 324, to the upper end of a lever 325, pivoted at 175, and the lower end of said lever having a pin 326, with or without a roll thereon, for engagement with a groove in the cam-disk 327, which is secured to the main-shaft 62. The outer end of the other rod 421, is connected by a link 422, with the upper end of a lever 423, pivoted at 172ª, the lower end of said lever having loosely connected with it a long link 424, which is connected with the aforesaid lever 325. As the main-shaft rotates the cam-disk 327, by means of the link and lever-mechanism described reciprocates the sliding plates. These plates or blades moving inward toward each other in a plane with the top of the box, engage the unattached portions of the laces, and fold them inward toward each other, the lines of fold or the crease being thus well defined, so that they will thereafter have an inherent tendency to fold inward to cover the top of the contents of the box, after the plunger has been withdrawn or lifted.

Obviously, many of the essential elements of the different groups of mechanisms herein described may be changed without departing from the spirit and scope of this invention, and it is still more obvious that the operating-means for these elements, or their equivalents, may be changed.

Claims:—

1. In a machine for attaching laces to boxes, the combination of gluing-mechanism and lace-attaching mechanism arranged side by side with a box-receiving space between them, and an intermittently operated feeding-device for feeding the boxes through the machine for coöperative relation with said mechanisms in succession, and for permitting the boxes to dwell for an interval of time in the space between said mechanisms.

2. In a machine for attaching laces to boxes, the combination of gluing-mechanism and lace-attaching mechanism, parallel tracks associated with the mechanisms, supporting-means for said tracks arranged for vertical adjustment, and a feeding-device for moving the boxes along the track, said feeding-device being supported by the means which supports the track and being adjustable therewith.

3. In a machine for attaching laces to boxes, the combination of a gluing-mechanism, lace-attaching mechanism, parallel tracks associated with said mechanisms, end supports for said tracks, means for adjusting said end-supports vertically and a feeding-device for the boxes supported by the end-supports.

4. In a machine for attaching laces to boxes, the combination of gluing-mechanism, lace-attaching mechanism, a pair of parallel tracks associated with the mechanisms, supporting means for the tracks arranged for transverse relative adjustment, and a feeding-device for the boxes supported by said supporting-means.

5. In a machine for attaching laces to boxes, the combination of gluing-mechanism and lace-attaching mechanism, a pair of parallel tracks associated with said mechanisms, said tracks having right-angularly-formed spaces with recesses opening thereinto, and arranged with said spaces facing each other, and means to feed the boxes along on said tracks.

6. In a machine for attaching laces to boxes, the combination of an adjustable gluing-mechanism and adjustable lace-attaching mechanism, parallel tracks associated with said mechanisms, supporting-means for said tracks, independent means for adjusting said tracks transversely and vertically, and a feeding-mechanism for moving the boxes along the tracks which is supported by said supporting-means.

7. In a machine for attaching laces to boxes, the combination of an adjustable gluing-mechanism and adjustable lace-attaching mechanism, a pair of parallel tracks associated with said mechanisms, supporting-means for said tracks, means for supporting each end of each track, means connecting the supports at each end of the track, and means connected to said first-mentioned means for simultaneously adjusting both of said tracks laterally and vertically.

8. In a machine for attaching laces to boxes, the combination of gluing-mechanism and lace-attaching mechanism, arranged side by side with a definite space between them, means arranged to support the boxes, and an intermittent feeding-device for moving the boxes along said means for coöperative relation with the gluing-mechanism, and in coöperative relation with the lace-attaching mechanism and permitting the boxes to dwell for an interval of time in the space between said mechanisms.

9. In a machine for attaching laces to boxes, the combination of gluing-mechanism and lace-attaching mechanism, arranged side by side with a definite space between them, guiding and supporting-means for the boxes associated with said mechanisms, and an intermittingly operated feeding-device for feeding the boxes along said means, for coöperative relation with said mechanisms in succession, and permitting the boxes to dwell for an interval of time in the space between said mechanisms.

10. In a machine for attaching laces to boxes, the combination of gluing-mechanism and lace-attaching mechanism, arranged side by side with a definite space between them, a pair of parallel arranged tracks associated with said mechanisms for guiding and supporting the boxes, and an intermittent feeding-device for moving the boxes along on the tracks, step by step, into successive coöperation with said mechanisms, and permitting them to dwell for an interval of time therebetween.

11. In a machine for attaching laces to boxes, the combination of gluing-mechanism and lace-attaching mechanism, arranged in alinement, with a definite space between them, a pair of parallel tracks associated with said mechanisms for guiding and supporting the boxes, which extend beyond said mechanisms and support the boxes, successively, in front of the gluing-mechanism, in coöperative relation with the gluing-mechanism, in the space between said mechanisms, in coöperative relation with the lace-attaching mechanism and in rear of said lace-attaching mechanism, and intermittingly operated means to move the boxes along on said tracks and temporarily arrest them in each of said successive positions.

12. In a machine for attaching laces to boxes, the combination of adjustable gluing-mechanism and adjustable lace-attaching mechanism, a pair of parallel tracks associated with said mechanisms, supporting-means for said tracks arranged for vertical adjustment, and a feeding-device for moving the boxes along on the tracks, said feeding-device being supported by the means which supports the tracks, and being adjustable therewith.

13. In a machine for attaching laces to boxes, the combination of adjustable gluing-mechanism and adjustable lace-attaching mechanism, a pair of parallel tracks associated with said mechanisms, end-supports for said tracks, means for adjusting said end-supports vertically, and a feeding-device for the boxes supported by said end-supports.

14. In a machine for attaching laces to boxes, the combination of adjustable gluing-mechanism, and adjustable lace-attaching mechanism, a pair of parallel tracks associated with said mechanism, supporting-means for said tracks arranged for transverse relative adjustment, and a feeding-device for moving the boxes along on the tracks, said feeding-device being supported by said supporting-means.

15. In a machine for attaching laces to boxes, the combination of adjustable gluing-mechanism and adjustable lace-attaching mechanism, a pair of parallel tracks associated with said mechanisms, supporting-means for said tracks including brackets, means for adjusting said brackets transversely with respect to each other, and a feeding-device for moving the boxes along on the tracks, which is supported by said supporting-means.

16. In a machine for attaching laces to boxes, the combination of adjustable gluing-mechanism and adjustable lace-attaching mechanism, a pair of parallel tracks associated with said mechanisms, supporting-means for said tracks arranged for vertical and also transverse relative adjustment, and a feeding-device for moving the boxes along on the tracks, which is supported by said supporting-means.

17. In a machine for attaching laces to boxes, the combination of adjustable gluing-mechanism and adjustable lace-attaching mechanism, a pair of parallel tracks associated with said mechanisms, end-supports for said tracks, brackets bearing said end-supports, means for adjusting the end-supports vertically, independently of the brackets, means for adjusting the brackets transversely with respect to each other, and a feeding-device for moving the boxes along on the tracks, which is supported by said end-supports.

18. In a machine for attaching laces to boxes, the combination of gluing-mechanism comprising a pair of gluing-members arranged with their engaging-portions facing outward for engagement with the inner-faces of the side-walls of a box, operating-means for said members, and glue-supplying means for said members, lace-attaching mechanism arranged adjacent said gluing-mechanism, and movable means for holding the boxes successively in coöperative relation with said gluing-mechanism and lace-attaching mechanism.

19. In a machine for attaching laces to boxes, the combination of gluing-mechanism comprising a pair of gluing-members having detachable engaging-portions both arranged to face outward for engagement with the inner-faces of the side-walls of a box, operating-means for said members, and glue-supplying means for said members, lace-attaching mechanism arranged adjacent said gluing-mechanism, and movable means for holding the boxes successively in coöperative relation with said gluing-mechanism and lace-attaching mechanism.

20. In a machine for attaching laces to boxes, the combination of gluing-mechanism comprising a pair of gluing-members arranged to enter the boxes and engage the inner-faces of the side-walls thereof, means to move said members, and glue-supplying means for said members, lace-attaching mechanism arranged adjacent said gluing-mechanism, and movable means for holding the boxes successively in coöperative relation with said gluing-mechanism and lace-attaching mechanism.

21. In a machine for attaching laces to boxes, the combination of gluing-mechanism comprising a pair of gluing-members arranged to enter the boxes and engage the inner-faces of the side-walls thereof, means to move said members simultaneously, and glue-supplying means for said members, lace-attaching mechanism arranged adjacent said gluing-mechanism, and movable means for holding the boxes successively in coöperative relation with said gluing-mechanism and lace-attaching mechanism.

22. In a machine for attaching laces to boxes, the combination of gluing-mechanism comprising a pair of gluing-members arranged to enter the boxes and engage the inner-faces of the side-walls thereof, a vertically movable frame bearing said members, means to move said frame, and glue-supplying means for the members, lace-attaching mechanism arranged adjacent said gluing-mechanism, and movable means for holding the boxes successively in coöperative relation with said gluing-mechanism and lace-attaching mechanism.

23. In a machine for attaching laces to boxes, the combination of gluing-mechanism comprising a pair of gluing-members arranged to enter the boxes and engage the inner-faces of the side-walls thereof, a vertically movable frame upon which said members are slidably supported, means to move the frame, and means to slide the members, lace-attaching mechanism arranged adjacent said gluing-mechanism, and movable means arranged to present the boxes successively into coöperative relation with said gluing-mechanism and lace-attaching mechanism.

24. In a machine for attaching laces to boxes, the combination of gluing-mechanism comprising a pair of gluing-members movable downwardly to enter the boxes and laterally to engage the inner-faces of the side-walls thereof, operating-means for said members, glue-supplying means for said members, lace-attaching mechanism arranged adjacent said gluing-mechanism, and movable means for holding the boxes successively in coöperative relation with said gluing-mechanism and lace-attaching mechanism.

25. In a machine for attaching laces to boxes, the combination of gluing-mechanism comprising a pair of gluing-members movable downwardly to enter the boxes and laterally to engage the glue-supplying means at one part of the stroke, and laterally to engage the inner-faces of the side-walls of the boxes at another part of the stroke, and operating-means for said members, and glue-supplying means for the members, lace-attaching mechanism arranged adjacent said gluing-mechanism, and movable means for holding the boxes, successively, in coöperative relation with said gluing-mechanism and lace-attaching mechanism.

26. In a machine for attaching laces to boxes, the combination of gluing-mechanism comprising a pair of gluing-members, a vertically movable frame on which said members are supported to slide in a direction at right-angles to the vertical movement of the frame, means to move the frame vertically to cause the members to enter the boxes, and means to slide the members laterally to cause them to engage the inner-faces of the side-walls of the boxes, and glue-supplying means for the members.

27. In a machine for attaching laces to boxes, the combination of gluing-mechanism comprising a pair of gluing-members, a vertically movable frame on which said members are supported to slide in a direction at right-angles to the vertical movement of the frame, means to move the frame vertically to cause the members to enter the boxes, and means to slide the members laterally to cause them to engage the glue-supplying means and again to cause them to engage the inner-faces of the side-walls of the boxes, lace-attaching mechanism arranged adjacent said gluing-mechanism, and movable-means for holding the boxes successively in coöperative relation with said gluing-mechanism and lace-attaching mechanism.

28. In a machine for attaching laces to boxes, the combination of gluing-mechanism comprising a pair of gluing-members arranged to enter the boxes and engage the inner-faces of the side-walls thereof, means to move said members, and glue-supplying means comprising glue-containing receptacles, and glue-rolls arranged for engagement with said gluing-members, lace-attaching mechanism arranged adjacent said gluing-mechanism, and movable means arranged to hold the boxes, successively, in coöperative relation with said gluing-mechanism and lace-attaching mechanism.

29. In a machine for attaching laces to boxes, the combination of gluing-mechanism comprising a pair of gluing-members arranged to enter the boxes and engage the inner-faces of the side-walls thereof, means to move said members, and glue-supplying means comprising glue-containing receptacles, and glue-rolls arranged for engagement with said gluing-members, said glue-rolls and gluing-members, when in elevated position, occupying substantially the same horizontal plane, lace-attaching mechanism arranged adjacent said gluing-mechanism, and movable-means for holding the boxes successively in coöperative relation with said gluing-mechanism and lace-attaching mechanism.

30. In a machine for attaching laces to boxes, the combination of gluing-mechanism comprising a pair of gluing-members arranged to enter the boxes and engage the inner-faces of the side-walls thereof, means to move said members, and glue-supplying means comprising glue-containing receptacles and positively driven glue-rolls arranged for engagement with the gluing-members, and means to supply said glue-rolls with glue, lace attaching mechanism arranged adjacent said gluing-mechanism, and movable means for holding the boxes, successively, in coöperative relation with said gluing-mechanism and lace-attaching mechanism.

31. In a machine for attaching laces to boxes, the combination of gluing-mechanism comprising a pair of gluing-members arranged to enter the boxes and engage the inner-faces of the side-walls thereof, means for adjusting said members to engage boxes of different widths, means to move said members, and glue-supplying means for said members, which is adjustable to accommodate the gluing-members in their different positions of adjustment.

32. In a machine for attaching laces to boxes, the combination of gluing-mechanism comprising a pair of gluing-members arranged to enter the boxes and engage the inner-faces of the side-walls thereof, means for adjusting said members to engage boxes of different widths, means to move said members, and glue-supplying means comprising glue-containing receptacles, and positively driven glue-rolls arranged for engagement with the glue-members, and means to supply said glue-rolls with glue, said receptacles being adjustable to correspondingly adjust the glue-rolls to accommodate the gluing-members in their different positions of adjustment.

33. In a machine for attaching laces to boxes, the combination of gluing-mechanism comprising a pair of gluing-members arranged to enter the boxes and engage the inner-faces of the side-walls thereof, means for adjusting said members to engage boxes of different widths, means to move said members, and glue-supplying means for said members, which is adjustable to accommodate the gluing-members in their different positions of adjustment, and driving-means for the glue-supplying means which is operative in all positions of adjustment of the glue-supplying means.

34. In a machine for attaching laces to boxes, the combination of gluing-mechanism, lace-attaching mechanism, a pair of parallel tracks associated with said mechanism, supporting-means for said tracks including brackets, means for attaching the brackets transversely with respect to each other, and a feeding-device for the boxes supported by said supporting-means.

35. In a machine for attaching laces to boxes, the combination of a gluing-mechanism, lace-attaching mechanism, parallel tracks associated with said mechanisms, supporting-means for the tracks, means for vertically and transversely adjusting the supporting-means, and a feeding-device for the boxes supported by said supporting-means.

36. The combination of box-supporting means, gluing-means for applying glue to the box, and lace-producing and attaching-means for producing and attaching laces to the glued surfaces of the boxes.

37. The combination of lace-producing and attaching-means, perforating-means associated therewith, gluing-means, and box-supporting-means.

38. The combination of box-supporting means, gluing-means for applying glue to the box, and lace-producing and attaching-means for producing and attaching laces to the glued surfaces of the boxes, and folding-means for folding the attached laces.

39. The combination of lace-producing and attaching-means, perforating-means associated therewith, gluing-means, folding-means for the laces, and box-supporting-means.

40. The combination of means for supporting and feeding boxes intermittently, gluing-mechanism for depositing layers of glue on the inner-faces of the side-walls of the boxes, and lace-producing and attaching-means for producing and attaching laces to the glued surfaces of the boxes.

41. The combination of means for supporting and feeding boxes intermittently, gluing-mechanism for depositing layers of glue on the inner-faces of the side-walls of the boxes, lace-producing and attaching-means for producing and attaching laces to the glued surfaces of the boxes, and perforating-means associated therewith.

42. The combination of means for supporting and feeding boxes intermittently, gluing-mechanism for depositing layers of glue on the inner-faces of the side-walls of the boxes, lace-producing and attaching-means for producing and attaching laces to the glued surfaces of the boxes, and folding-means associated therewith by which the laces are folded inward.

43. The combination of means for supporting and feeding boxes intermittently, gluing-mechanism for depositing layers of glue on the inner-faces of the side-walls of the boxes, lace-producing and attaching-means for producing and attaching laces to the glued surfaces of the boxes, and perforating-means for the laces, and folding-means by which the laces are folded inward.

44. The combination of means for supporting and feeding boxes intermittently, gluing-mechanism for depositing layers of glue on the inner-faces of the side-walls of the boxes, intermittent means for advancing strips of paper and projecting the end-portions thereof into the boxes, and means for pressing said end-portions into engagement with the glued surfaces of the boxes, and means for severing the strips to form the laces.

45. The combination of means for supporting and feeding boxes intermittently, gluing-mechanism for depositing layers of glue on the inner-faces of the side-walls of the boxes, intermittent-means for advancing strips of paper and projecting the end-portions thereof into the boxes, and means arranged for engagement with said end-portions to move them laterally into engagement with the glued surfaces of the boxes, and movable means to support said side-walls against lateral deflection, when the end-portions are moved into engagement therewith, and means to sever the strips.

46. The combination of means for supporting and feeding boxes intermittently, gluing-mechanism for depositing layers of glue on the inner-faces of the side-walls of the boxes, intermittent-means for advancing strips of paper and projecting the end-portions thereof into the boxes, a plunger arranged for movement between the end-portions of the strips to move said end-portions laterally into engagement with the glued surfaces of the boxes, and severing-means for the strips.

47. The combination of means for supporting and feeding boxes intermittently, gluing-mechanism for depositing layers of glue on the inner-faces of the side-walls of the boxes, intermittent-means for advancing strips of paper and projecting the end-portions thereof into the boxes, a plunger arranged for movement between the end-portions of the strips to move said end-portions laterally into engagement with the glued surfaces of the boxes, movable means arranged to support said side-walls against lateral deflection when the end-portions are moved into engagement therewith, and means to sever the strips.

48. The combination of means for supporting and feeding boxes intermittently, gluing-mechanism for depositing layers of glue on the inner-faces of the side-walls of the boxes, intermittent-means for advancing strips of paper and projecting the end-portions thereof into the boxes, means arranged to move said end-portions of the strips laterally, for engagement with the glued surfaces of the boxes, presser-bars arranged for movement against the outside of the side-walls of the boxes when the end-portions engage the glued surfaces thereof, and means to sever the strips.

49. The combination of means for supporting and feeding boxes intermittently, gluing-mechanism for depositing layers of glue on the inner-faces of the side-walls of the boxes, intermittent-means for advancing strips of paper and projecting the end-portions thereof into the boxes, means arranged to move said end-portions of the strips laterally, for engagement with the glued surfaces of the boxes, presser-bars arranged for movement against the outside of the side-walls of the boxes when the end-portions engage the glued surfaces thereof, and means for adjusting said presser-bars.

50. The combination of means for supporting and feeding boxes intermittently, gluing-mechanism for depositing layers of glue on the inner-faces of the side-walls of the boxes, intermittent-means for advancing strips of paper and projecting the end-portions thereof into the boxes, a plunger arranged to move said end-portions laterally into engagement with the glued surfaces of the boxes, presser-bars arranged for movement against the outside of the side-walls of the boxes at the time the plunger is operated, and means to sever the strips.

51. The combination of means for supporting and feeding boxes intermittently, gluing-mechanism for depositing layers of glue on the inner-faces of the side-walls of the boxes, intermittent-means for advancing strips of paper and projecting the end-portions thereof into the boxes, a plunger arranged for vertical movement between the end-portions of the strips, which is made of an area substantially equal to the area of the openings in the boxes, to move said end-portions laterally for engagement with the glued surfaces of the boxes, and means to sever the strips.

52. The combination of box-supporting means, means for supporting rolls of paper, means for drawing short lengths of paper from the rolls with their end-portions arranged for attachment to opposite walls of the boxes, and means to sever the strips of paper above the tops of the boxes.

53. The combination of means for supporting rolls of paper, means for drawing short lengths of paper from the rolls, box-supporting means, gluing-means for applying a layer of glue to the opposite walls of the box; means for attaching the end-portions of the strips of paper to the glued portions of the box, and means for severing the strips of paper above the tops of the boxes.

54. The combination of box-supporting means, means for supporting rolls of paper, means for drawing short lengths of paper from the rolls with their end-portions arranged for attachment to the boxes, means for attaching the short lengths of paper to the boxes, means to sever the strips of paper above the tops of the boxes, and means to perforate the strips below the lines of severance.

55. The combination of box-supporting means, means for supporting rolls of paper, means for drawing short lengths of paper from the rolls with their end-portions arranged for attachment to opposite walls of the boxes, attaching means therefor, and means to sever the strips of paper above the tops of the boxes and means to fold inward the upper portions of the severed pieces.

56. The combination of box-supporting means, means for supporting rolls of paper, means for drawing short lengths of paper from the rolls with their end-portions arranged for attachment to the boxes, attaching means therefor and means to sever the strips of paper above the tops of the boxes, means to perforate the strips below the line of severance, and means to fold inward the upper portions of the severed pieces.

57. The combination of means for supporting and feeding boxes intermittently, gluing-mechanism for depositing layers of glue on the inner-faces of the side-walls of the boxes, means for supporting rolls of paper, means for drawing short lengths of paper from the rolls and projecting their end-portions into the boxes, means arranged to move said end-portions into engagement with the glued surfaces of the boxes, and means to sever the strips.

58. The combination of means for supporting and feeding boxes intermittently, gluing-mechanism for depositing layers of glue on the inner-faces of the side-walls of the boxes, means for supporting rolls of paper, means for drawing short lengths of paper from the rolls and projecting their end-portions into the boxes, lateral guiding-means for the free end-portions of the strips, means for moving said end-portions into engagement with the glued surfaces of the boxes, and means for severing the strips.

59. The combination of supporting-means for the boxes, gluing-means, brackets arranged to support rolls of paper, feeding-rolls for the paper supported by said brackets and arranged to draw short lengths of paper from the paper rolls and project the end-portions of the strips of paper into the boxes for attachment to the side-walls thereof, operating-means for both feeding-rolls supported essentially by the brackets, and means for adjusting the brackets toward and from each other, and means to sever the strips.

60. The combination of box-supporting-means, gluing-means, means for supporting rolls of paper, intermittingly operated feeding-rolls for drawing short lengths of paper from the rolls, means for attaching the end-portions of the strips of paper to opposite walls of the boxes, and means for severing the strips a short distance above the tops of the boxes leaving unattached portions above the tops of the boxes.

61. The combination of box-supporting means, gluing-means, means for supporting rolls of paper above the boxes, two pairs of intermittingly operated feeding-rolls for drawing short lengths of paper from said paper rolls, operating-means associated with both pairs of feeding-rolls for operating them simultaneously, and complemental simultaneously operating severing-means arranged to sever both strips above the top of the box, leaving unattached end-portions projecting above the top of the box.

62. The combination of box-supporting-means, gluing-means, means for supporting rolls of paper, means for drawing short lengths of paper from the rolls, means for attaching the end-portions of the strips of paper to the boxes, a die-block and perforating-devices arranged to engage the end-portions of the strips and press them against the die-block to perforate them, and means to sever the strips above the perforated portions.

63. The combination of box-supporting-means, gluing-means, means for supporting rolls of paper, means for drawing short lengths of paper from the rolls, means for attaching the end-portions of the strips of paper to the boxes, a die-block arranged for vertical movement between the strips of paper and perforating-devices arranged for horizontal movement toward and from the die-block to engage the strips of paper and perforate them, and means to sever the strips above the perforated portions.

64. The combination of box-supporting means, gluing-means, means for supporting rolls of paper, means for drawing short lengths of paper from the rolls, means for attaching the end-portions of the strips of paper to the boxes, a die-block and perforating-devices arranged for coöperation therewith, to engage and perforate the strips of paper, means for adjusting said perforating-devices, and means to sever the strips.

65. The combination of box-supporting means, gluing-means, means for supporting rolls of paper, means for drawing short lengths of paper from the rolls, means for attaching the end-portions of the strips of paper to the boxes, a die-block and perforating-devices arranged to engage the end-portions of the strips and press them against the die-block to perforate them, said perforating-devices having associated therewith cutting-projections which coöperate with said die-block to sever the strips.

66. The combination of box-supporting-means, gluing-means, means for supporting rolls of paper, means for drawing short lengths of paper from the rolls, means for attaching the end-portions of the strips of paper to the boxes, a die-block arranged for vertical movement between the strips of paper, and perforating-devices arranged to engage the end-portions of the strips and press them against the opposite sides of the die-blocks to perforate them, and cutting-projections arranged on said perforating-devices for coöperation with said die-block to sever the strips.

67. The combination of box-supporting means, gluing-means, means for supporting rolls of paper, means for drawing short lengths of paper from the rolls, means for attaching the end-portions of the strips of paper to the boxes, a die-block of an area substantially equal to the area of the box opening arranged for vertical movement between the strips of paper, and perforating-devices arranged for movement toward and from the opposite sides of said block to engage the strips of paper and perforate them, and means to sever the strips above the perforated portions.

68. The combination of box-supporting means, gluing-means, means for supporting rolls of paper, means for drawing short lengths of paper from the rolls, means for attaching the end-portions of the strips of paper to the boxes, a die-block, perforating-plates and movable supports therefor to which said plates are detachably connected, said perforating-plates being arranged for engagement with the end-portions of the strips and to press them against the die-block to perforate them, and means to sever the strips above the perforated portions.

69. The combination of box-supporting means, gluing-means, means for supporting rolls of paper, means for drawing short lengths of paper from the rolls, means for attaching the end-portions of the strips of paper to the boxes, a die-block, perforating-devices arranged to engage the end-portions of the strips and press them against the die-block to perforate them, said perforating-devices being made adjustable, and means to sever the strips above the perforated portions.

70. The combination of box-supporting means, gluing-means, supporting-means for rolls of paper, means for drawing short lengths of paper from the rolls, means for attaching the end-portions of the strips of paper to opposite walls of the boxes, means for severing the strips above the tops of the boxes leaving projecting unattached portions, and means to fold inward said unattached portions.

71. The combination of box-supporting means, gluing-means, supporting-means for rolls of paper, means for drawing short lengths of paper from the rolls, means for attaching the end-portions of the strips of paper to the boxes, means for severing the strips above the tops of the boxes leaving projecting unattached portions, and horizontally movable blades arranged to fold inward said unattached portions.

72. The combination of box-supporting means, gluing-means, supporting-means for rolls of paper, means for drawing short lengths of paper from the rolls, means for attaching the end-portions of the strips of paper to the boxes, including a plunger, means for severing the strips of paper above the tops of the boxes leaving projecting unattached portions, and blades arranged to fold inward said unattached portions on top of the plunger.

73. The combination of box-supporting means, gluing-means, supporting-means for rolls of paper, means for drawing short lengths of paper from the rolls, means for attaching the end-portions of the strips of paper to the boxes, including a plunger, perforating-means for the strips including a die-block which is arranged between them, means to sever the strips above the perforated portions leaving unattached perforated portions projecting above the tops of the boxes, means to fold inward said unattached portions on top of thé plunger, said plunger and die-block being movable in a downward direction, and relatively movable in an upward direction.

74. The combination of box-supporting means, gluing-means, supporting-means for rolls of paper, means for drawing short lengths of paper from the rolls, means for attaching the end-portions of the strips of paper to the boxes, perforating-means arranged to engage the strips above the tops of the boxes, means to sever the strips above the perforated portions leaving unattached perforated portions projecting above the tops of the boxes, and means arranged to fold inward said unattached perforated portions.

75. The combination of means for supporting and feeding boxes intermittently, gluing-mechanism for depositing layers of glue on the inner faces of the side walls of the boxes, intermittent means for advancing strips of paper and for projecting the end-portions thereof into the boxes, and a plunger arranged for movement between the end-portions of a strip to move said end-portions laterally into engagement with the glued surfaces of the boxes.

76. The combination of means for supporting rolls of paper, means for advancing a short length of paper into the boxes with its end-portions arranged for attachment to a wall of the boxes, gluing-means for applying a film of glue to the wall of the box, and means for forcing the end-portion of the strip of paper against the glued portion of the box-wall.

77. The combination of box-supporting and conveying means, and successively operating gluing, fly-attaching, and lace-producing means.

78. The combination of box-supporting and conveying means, and successively operating gluing, fly-attaching lace-producing, and lace-folding means.

In testimony whereof, we have signed our names to this specification, in the presence of two subscribing witnesses.

DALE G. STEELY.
FREDERICK W. BLAKE.
GUSTAVE A. LORENTZEN.

Witnesses:
THOMAS J. SHEERIN,
GEORGE H. WALLEOCTON.

Copies of this patent may be obtained for five cents each, by addressing the "Commissioner of Patents. Washington, D. C."